(12) United States Patent
Lin et al.

(10) Patent No.: US 9,810,523 B2
(45) Date of Patent: Nov. 7, 2017

(54) DAMAGE DETERMINATION OF V-SHAPED GROOVE GUIDE ON ROLLER V-SHAPED

(71) Applicant: NATIONAL APPLIED RESEARCH LABORATORIES, Taipei (TW)

(72) Inventors: Yu-Hsuan Lin, Taipei (TW);
Chih-Chung Yang, Taipei (TW);
Kuo-Cheng Huang, Taipei (TW);
Tai-Shan Liao, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 414 days.

(21) Appl. No.: 14/602,259

(22) Filed: Jan. 21, 2015

(65) Prior Publication Data

US 2016/0209202 A1    Jul. 21, 2016

(51) Int. Cl.
*G01B 11/08*    (2006.01)
*G01B 11/24*    (2006.01)

(52) U.S. Cl.
CPC ............. *G01B 11/08* (2013.01); *G01B 11/24* (2013.01)

(58) Field of Classification Search
None
See application file for complete search history.

(56) References Cited

U.S. PATENT DOCUMENTS

2012/0247167 A1* 10/2012 Austen .................. B21C 23/005
                                                           72/270

OTHER PUBLICATIONS

Parts failure analysis, copyright 2008, ArvinMeritor, manual TP-0445, 115 pages.*

* cited by examiner

*Primary Examiner* — Tung Lau
(74) *Attorney, Agent, or Firm* — Chih Feng Yeh; Huntington IP Consulting Co., Ltd.

(57) ABSTRACT

A method for determining if a wire guide roller having a plurality of V-shaped grooves, each having a copper line thereon, arranged column-by-column on a periphery direction thereof is failed after slicing a plurality of wafers is disclosed. Based on the disclosed technical means, the efficacy may be achieved that a damage situation may be automatically examined and notified to maintain a yield in the slicing process in an online high speed environment.

6 Claims, 5 Drawing Sheets

DAMAGE DETERMINATION OF V-SHAPED GROOVE GUIDE ON ROLLER V-SHAPED

BACKGROUND OF RELATED ART

Technical Field

The present invention relates to a method for determining if a wire guide roller for slicing wafers has to be replaced; more particularly, the present invention relates to a method for determining if the wire guide roller having a plurality of V-shaped grooves, each having a copper line thereon, arranged column-by-column on a periphery direction thereof is failed after slicing a plurality of wafers, based on an optical image technology.

Background Art

In semiconductor field, a wafer has to be sliced to obtain a very huge amount of chips. To perform such task in a high speed, a multiple wire saws slicing technology is generally employed. In this technology, a wire guide roller having a plurality of V-shaped grooves arranged in a periphery direction thereof is prepared, and on each of which a copper line is disposed for the slicing purpose. A tense controller is utilized for providing a stability and a tense strength of the copper line. For a given depth and width of the V-shaped groove, a thickness of the chip is determined. Such slicing technology includes the abrasive material absent and abrasive material involved manners. However, both the slicing technologies are invasive and additionally waste the chip material. In slicing, the copper line is brought to abrade periodically on the V-shaped groove. And, the copper line may tend to become unstable, resulting in that the V-shaped groove is damaged. This may cause the sliced chips to have a non-uniform thickness and surface. Conventionally, a determination regarding if the wire guide roller may still be used, i.e. if the copper line and the V-shaped groove is undertaken by checking up the thickness of the sliced chips. Another fashion is to analyze a 3-dimensional special information within the V-shaped groove by using a probe scan for a precise examination object. However, an online V-shaped groove examination usually involves an examination time limitation, and the above examination does not meet the irreverent requirement.

There have been a few effort aiming at copper line abrasion based on image analysis in the high speed wafer slicing field; however, analysis and evaluation of the abraded V-shaped groove are still absent. Presently, the available abrasion evaluation is undertaken by using a contact ellipsometer, but which is considered very slow in speed and costly in price. Some projection based equipment has been also developed for actual analysis, but its measurement range is restricted by the analysis. An optical interference tomography is a contact measurement, and thus not appropriate to the massive V-shaped groove measurement. Some optical fiber based V-shaped groove analyses have been seen, but they are shallowly related to the wafer slicing field.

In view of the above, it may be known that there has long been the issue of the improper high speed V-shaped groove examination technology for wafer slicing. Therefore, there is quite a need to provide a technical means to overcome this problem.

SUMMARY

It is, therefore, an object of the present invention to provide a method for determining if a wire guide roller having a plurality of V-shaped grooves, each having a copper line thereon, arranged column-by-column on a periphery direction thereof is failed after slicing a plurality of wafers, so that a damage situation may be automatically examined and notified to maintain a yield in the slicing process in an online high speed environment.

According to the present invention, the method for determining if the wire guide roller having the plurality of V-shaped grooves, each having the copper line thereon, arranged column-by-column on a periphery direction thereof is failed after slicing the plurality of wafers comprises steps of (a) defining a normalized damage equation involving a plurality of parameters for a damage ratio of each of the plurality of V-shaped grooves, and setting a minimum acceptable damage ratio; (b) acquiring a picture of each of the plurality of V-shaped grooves in a depth direction thereof; (c) determining each of the plurality of parameters from the picture of each of the plurality of V-shaped grooves; (d) calculating the damage ratio of each of the plurality of V-shaped grooves from the normalized damage ratio, respectively; (e) comparing the damage ratio of each of the plurality of V-shaped grooves and the minimum acceptable damage ratio to determine if the V shaped groove is failed, respectively; (f) calculating an arithmetic damage relationship for the plurality of V-shaped grooves; and (g) comparing the arithmetic damage relationship and the minimum acceptable damage ratio to determine if the wire guide roller is failed.

In an embodiment, the arithmetic damage ratio in step (f) is a ratio of a failed number of the plurality of V-shaped grooves to a total number of the plurality of V-shaped grooves, and step (g) comprises further a step of (g1) if the ratio of the failed number of the plurality of V-shaped grooves to the total number of the plurality of V-shaped grooves is larger than the minimum acceptable damage ratio, determining the wire guide roller is failed.

In an embodiment, the arithmetic damage ratio in step (f) is an average of the damage ratio of the plurality of V-shaped grooves, and step (g) comprises further a step of (g2) if an average of the damage ratio of each of the plurality of V-shaped grooves is larger than the minimum acceptable damage ratio, determining the wire guide roller is failed.

In a preferred embodiment, wherein the damage ratio is $D=\pm(\{2*(R-r)*\sin\theta\})/S_0$, wherein D is the damage ratio, R is a damage diameter, r is a radius of the copper line, $\theta$ is a deviation angle of the copper line, and S0 is a maximum width of the V-shaped groove.

In an embodiment, step (b) comprises further a step of (b1) acquiring the picture of a lateral row portion of the plurality of V-shaped grooves first and then acquiring a rest portion of the plurality of V-shaped grooves row by row in the depth direction thereof.

In an embodiment, a step (h) is further comprised: automatically issuing a notification signal regarding the wire guide roller has become failed.

By using the technical means of the present invention, the efficacy may be achieved that a damage situation may be automatically examined and notified to maintain a yield in the slicing process.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

Figure 1:
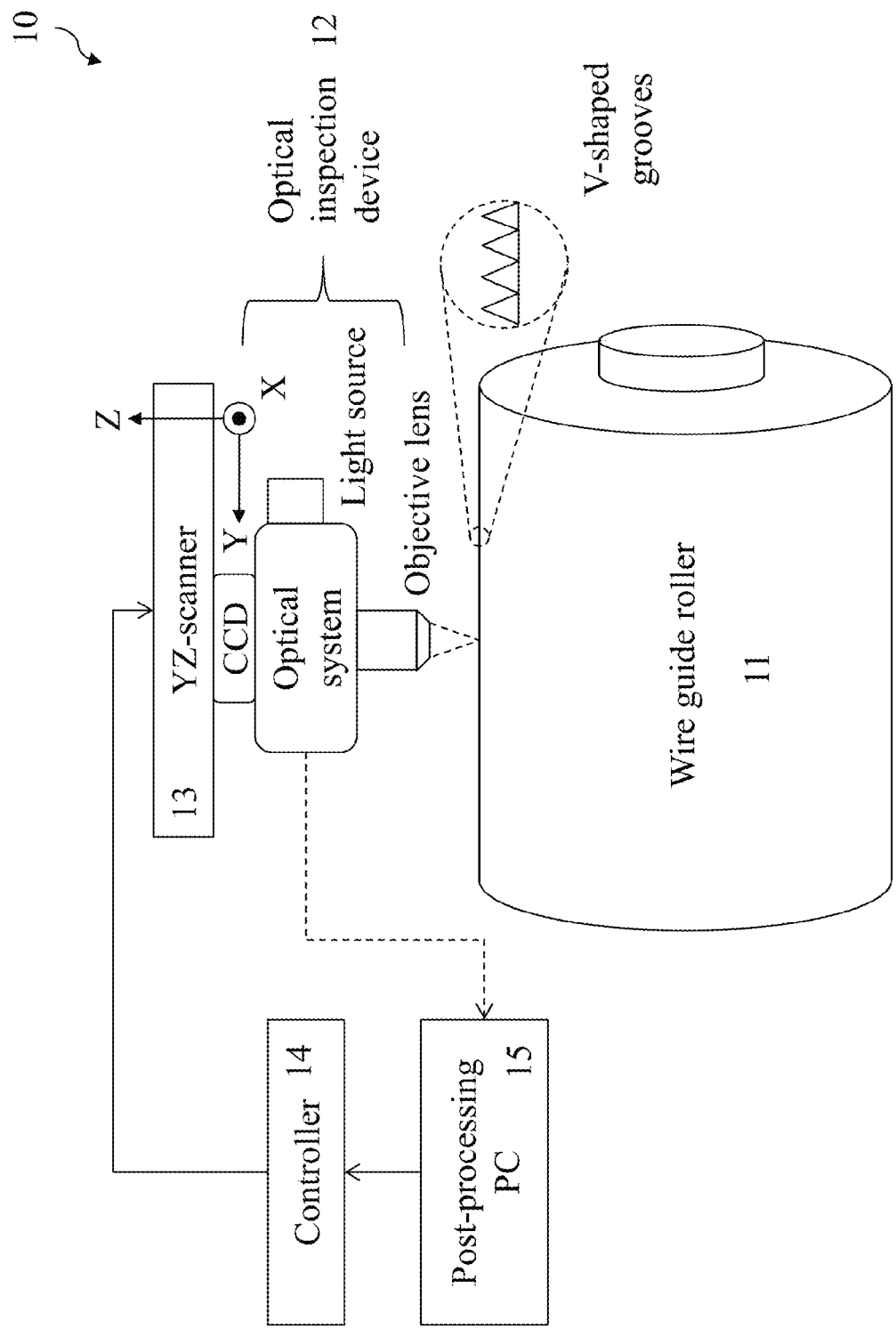
FIG. 1 is a schematic block diagram of a system for evaluating if a V-shaped groove on a wire guide roller for wafer slicing is damaged according to the present invention.

Now, prior to the description of a method for determining if a wire guide roller having a plurality of V-shaped grooves, each having a copper line thereon, arranged column-by-column on a periphery direction thereof is failed after slicing a plurality of wafers according to the present invention, a schematic block diagram of a system for performing the method will be introduced first, which is shown as FIG. 1.

As shown, the system 10 comprises a wire guide roller 11, an optical inspection device 12, a YZ-scanner 13, a controller 14, and a post-processing PC 15.

The wire guide roller 11 has the plurality of V-shaped grooves thereon, each bearing a copper line thereon, for slicing a wafer into a huge amount of chips.

The optical inspection device 12 is disposed above the wire guide roller 11 and used to receive an image reflected from each of the plurality of V-shaped grooves. Further, the optical inspection device 12 has a 20 times object lens with a shallow scene depth to promote an axial resolution of the image it acquires.

The YZ-scanner 13 is used to enable the optical inspection device 12 to move along Y and Z directions, respectively, and which may be operated automatically. When the portion of V-shaped grooves other than the shown lateral V-shaped grooves are scanned, the wire guide roller is manually rotated. Along the Y direction, the optical inspection device 12 may acquire the V-shaped grooves on the Y (lateral) direction. And, the lateral movement of the device 12 must be at least long enough to cover all the V-shaped grooves on the lateral direction. On the other, the optical inspection device 12 may acquire images from different depths within the V-shaped groove.

In acquiring the images on each of the focal planes within the V-shaped grooves, a movement resolution of the YZ scanner 13 may be set as 0.1 μm. This resolution has to be designated by taking the consideration of the longitudinal detailed contour, analogously, the optical image quality and the examination time for damage determination, so that an examination precision and high speed examination may become possible. At the same time, a width of the V-shaped groove at each of the selected focal plane is recorded. And, the lateral movement of the optical inspection device 12 has to be controlled by the YZ-scanner 13 at a resolution of such as 20 μm. The acquired images may be referred to together to reconstruct a contour within the V-shaped groove.

In actual cases, the damage usually occurs at a bottom of the V-shaped groove more significantly, and thus the sampled images at the bottom portion has to be promoted in number. Correspondingly, the lateral movement resolution of the YZ-scanner 13 is set as 10 μm. In this manner, the reconstructed 3D contour picture may show a better smoothness.

The controller 14 is used to control the motion of the optical inspection device 12.

The post-processing PC 15 is used to analyze and process the images acquired from the V-shaped, so that the determination if the V-shaped groove is damaged may be performed based on the analyses and processes.

Figure 2:
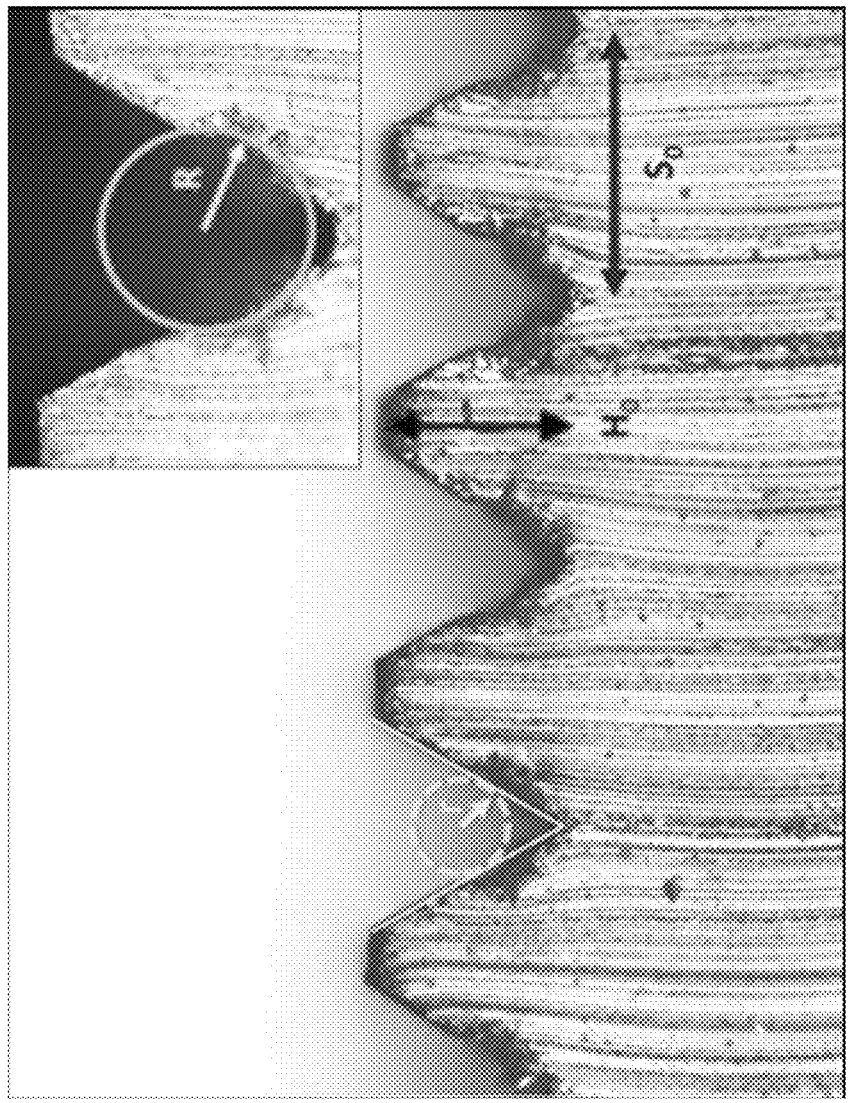
FIG. 2 is a picture taken from some V-shaped grooves along a lateral direction of the wire guide roller for illustrating a damage within the V-shaped groove in a quantized sense according to the present invention.
Figure 3:
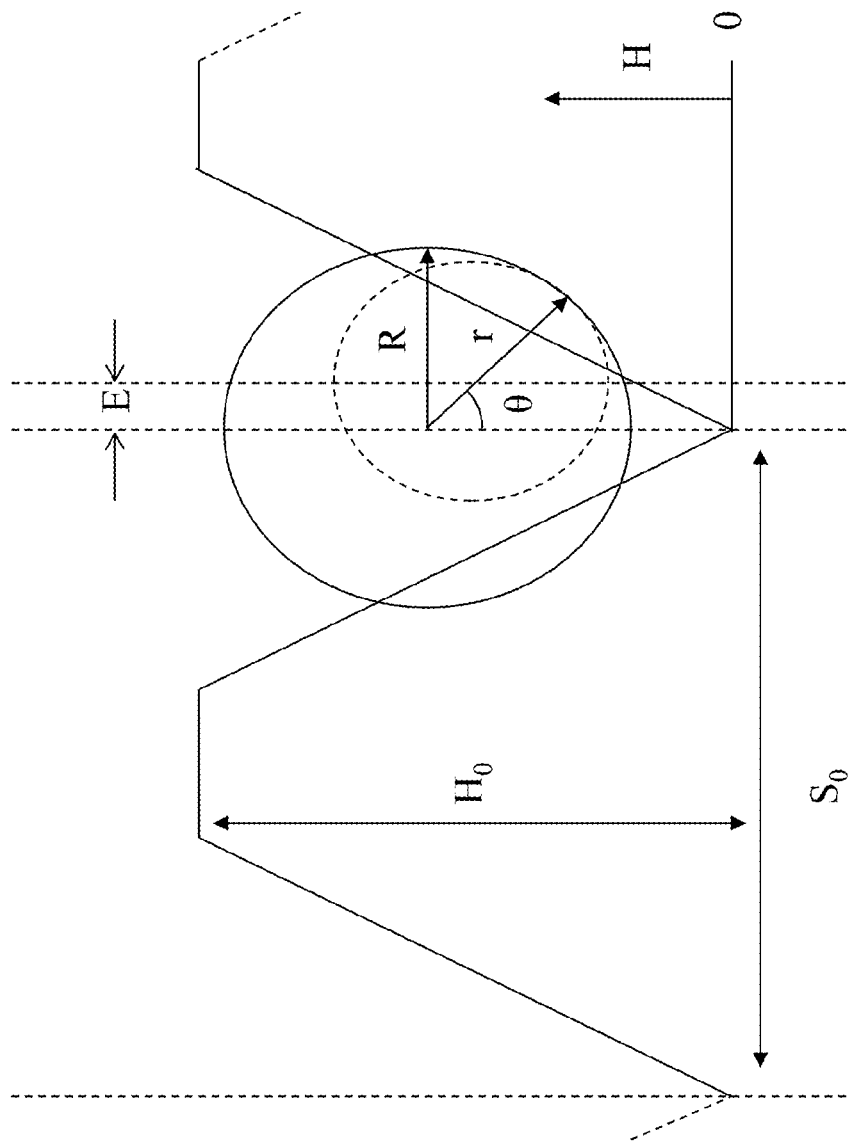
FIG. 3 is a parameter relationship diagram of a radius of a copper line, a damage circle and its damage radius, an altitude of the V-shaped groove, a width of the V-shaped groove, a deviation angle of the copper line, and a height of a focal plane within the V-shaped groove according to the present invention.

In the following, the damage within the V-shaped groove will be presented in a quantized sense. Referring now to FIG. 2 along with FIG. 3, a picture taken from some V-shaped grooves along a lateral direction of the wire guide roller for illustrating a damage within the V-shaped groove in a quantized sense according to the present invention, and a parameter relationship diagram of a radius of a copper line, a damage circle and its damage radius, an altitude of the V-shaped groove, a width of the V-shaped groove, and a height of a focal plane within the V-shaped groove according to the present invention are shown therein, respectively.

At first, parameters associated with the damaged V-shaped grooves are defined. Herein, R is set to a damage diameter, r to a radius of the copper line (shown with its cross section with its inner portion hollow but physically solid), θ to a deviation angle of the copper line, E to a thickness error of the sliced chip, D to a normalized damage ratio, and $S_0$ is a maximum width of the V-shaped groove. Additionally, H is set to an altitude of a given focal plane within the V-shaped groove. Then, the thickness error of the sliced chip E and the normalized damage ratio D are defined as the following equations (1) and (2), respectively, as:

$$E=(R-r)*\sin\theta, \text{ and} \quad (1)$$

$$D=\pm(\{2*(R-r)*\sin\theta\})/S_0 \quad (2).$$

Figure 4:
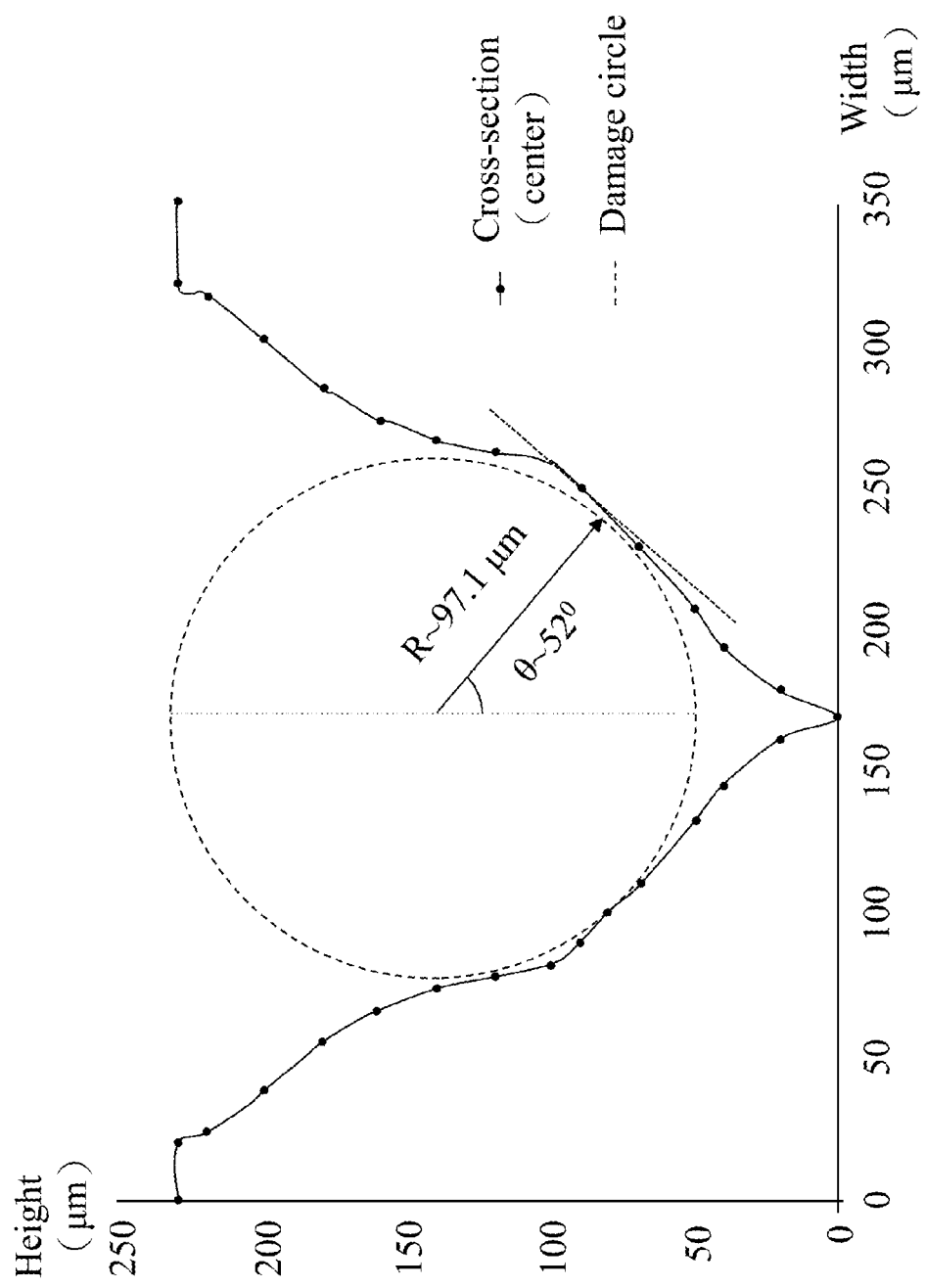
FIG. 4 is a schematic diagram of a cross section of the damaged V-shaped groove according to the present invention.

From equations (1) and (2), it may be known when the deviation angle θ goes larger, the thickness error of the sliced chip E and damage ration D become larger at the same time. Although the vibration of the copper line is unpredictable, the deviation angle θ of the copper line may still be estimated by referring to a cross section profile of the damaged V-shaped groove from the calculated images analyzed at the post-processing PC 15. One example of the reconstructed damaged V-shaped groove may be seen in FIG. 4, in which a schematic diagram of a cross section of the damaged V-shaped groove is shown.

In equation (2), the symbols "±" represent an approaching mode and a separating mode, respectively.

To express if the damage ratio of a certain V-shaped groove is exceedingly large and thus the V-shaped groove is classified as a damage, a maximum acceptable damage ratio is defined at this time. Usually, the maximum acceptable damage ratio is set as 15%, which is made based on experience of a semiconductor manufacturer. When the damage ratio of the V-shaped groove is larger than the 15% threshold, the V-shaped groove is determined as being damaged after the examination task. It is to be noted that a sample number of the V-shaped groove has to be large enough to express the situation that when the V-shaped groove damage occurs very non-uniformly. Herein, when a ratio of a number of the damaged V-shaped groove to a total number of the V-shaped groove is larger than a designated value, e.g. 12%, the wire guide roller is determined as being damaged and has to be replaced with a new one for the examination task. However, other embodiments may be possible. For example, an average value of the damage ratio of the total V-shaped grooves on the wire guide roller may be taken to compare with the maximum acceptable damage ratio to determine if the wire guide roller has become damaged and thus has to be replaced with a new one. Additionally, a notification signal may be provided when the wire guide roller is indicated as damaged and has to be replaced.

Figure 5:
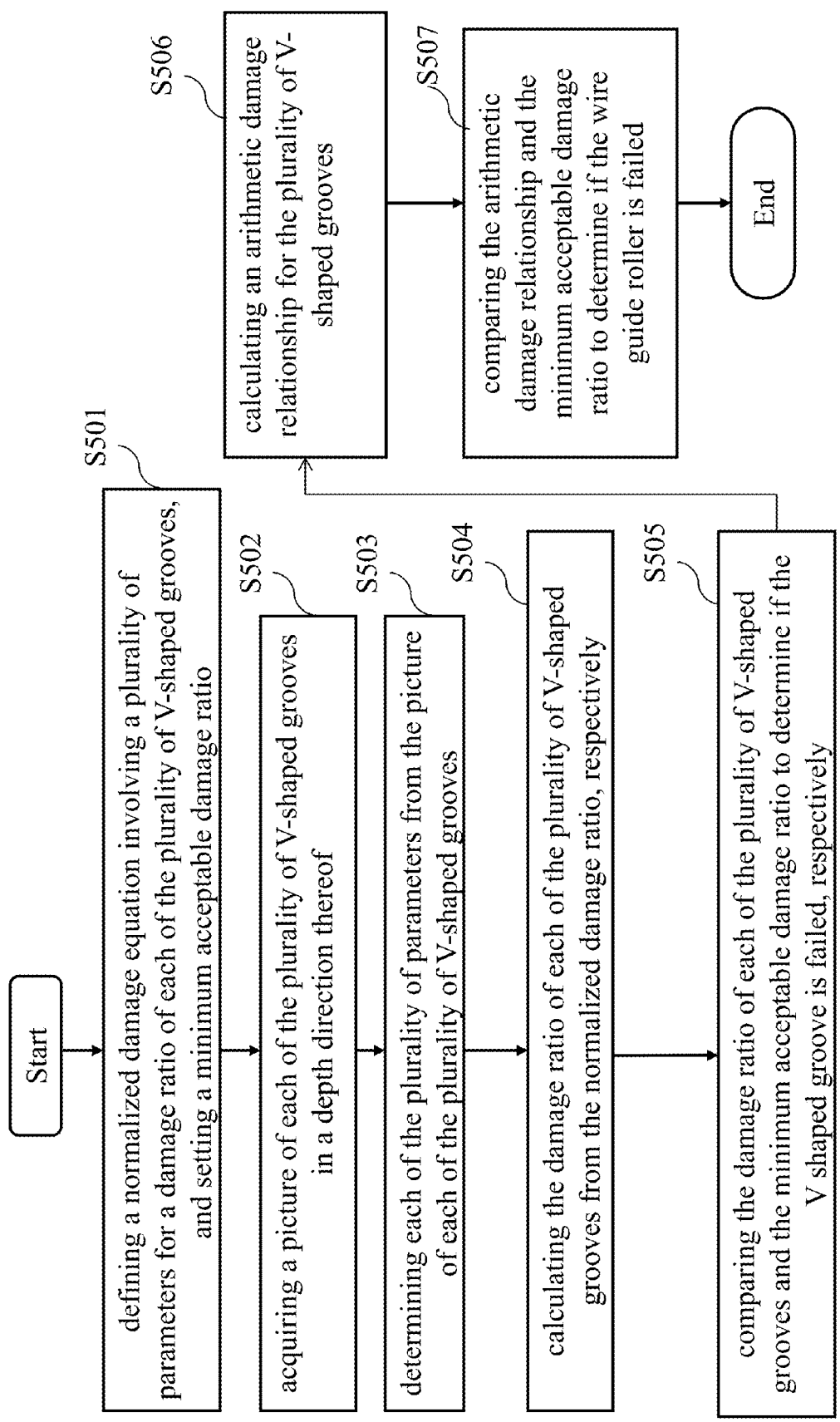
FIG. 5 is a flowchart of a method for determining if a wire guide roller having a plurality of V-shaped grooves, each having a copper line thereon, arranged column-by-column on a periphery direction thereof is failed after slicing a plurality of wafers according to the present invention.

Now, the method for determining if a wire guide roller having a plurality of V-shaped grooves, each having a copper line thereon, arranged column-by-column on a periphery direction thereof is failed after slicing a plurality of wafers according to the present invention is summarized as below, along with the illustration in FIG. 5

At first, a normalized damage equation involving a plurality of parameters for a damage ratio of each of the plurality of V-shaped grooves is defined, and a minimum acceptable damage ratio (S501). Next, a picture of each of the plurality of V-shaped grooves in a depth direction thereof is acquired (S502). Then, each of the plurality of parameters from the picture of each of the plurality of V-shaped grooves is determined (S503). Thereafter, the damage ratio of each of the plurality of V-shaped grooves from the normalized damage ratio is calculated (S504). Subsequently, the damage ratio of each of the plurality of V-shaped grooves and the minimum acceptable damage ratio to determine if the V shaped groove is failed is compared, respectively (S505). Then, an arithmetic damage relationship for the plurality of V-shaped grooves is calculated, respectively (S506). Finally, the arithmetic damage relationship and the minimum acceptable damage ratio to determine if the wire guide roller is failed is compared (S507).

By using the technical means of the present invention, the efficacy may be achieved that a damage situation may be automatically examined and notified to maintain a yield in the slicing process in an online high sped environment.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for determining if a wire guide roller having a plurality of V-shaped grooves, each having a copper line thereon, arranged column-by-column on a periphery direction thereof is failed after slicing a plurality of wafers, comprising steps of:
   (a) using a post-processing PC to define a normalized damage equation involving a plurality of parameters for a damage ratio of each of the plurality of V-shaped grooves, and set a minimum acceptable damage ratio;
   (b) using an optical inspection device to acquire a picture of each of the plurality of V-shaped grooves in a depth direction thereof;
   (c) using the post-processing PC to determine each of the plurality of parameters from the picture of each of the plurality of V-shaped grooves acquired from the optical inspection device;
   (d) using the post-processing PC to calculate the damage ratio of each of the plurality of V-shaped grooves from the normalized damage ratio, respectively;
   (e) using the post-processing PC to compare the damage ratio of each of the plurality of V-shaped grooves and the minimum acceptable damage ratio to determine if the V shaped groove is failed, respectively;
   (f) using the post-processing PC to calculate an arithmetic damage relationship for the plurality of V-shaped grooves; and
   (g) using the post-processing PC to compare the arithmetic damage relationship and the minimum acceptable damage ratio to determine if the wire guide roller is failed.

2. The method for determining if the wire guide roller having the plurality of V-shaped grooves, each having the copper line thereon, arranged column-by-column on the periphery direction thereof is failed after slicing the plurality of wafers as claim 1, wherein the arithmetic damage ratio in step (f) is a ratio of a failed number of the plurality of V-shaped grooves to a total number of the plurality of V-shaped grooves, and step (g) comprises further a step of:
   (g1) if the ratio of the failed number of the plurality of V-shaped grooves to the total number of the plurality of V-shaped grooves is larger than the minimum acceptable damage ratio, determining, through the post-processing PC, the wire guide roller is failed.

3. The method for determining if the wire guide roller having the plurality of V-shaped grooves, each having the copper line thereon, arranged column-by-column on the periphery direction thereof is failed after slicing the plurality of wafers as claimed 1, wherein the arithmetic damage ratio in step (f) is an average of the damage ratio of the plurality of V-shaped grooves, and step (g) comprises further a step of:
   (g2) if an average of the damage ratio of each of the plurality of V-shaped grooves is larger than the minimum acceptable damage ratio, determining, through the post-processing PC, the wire guide roller is failed.

4. The method for determining if the wire guide roller having a plurality of V-shaped grooves, each having the copper line thereon, arranged column-by-column on the periphery direction thereof is failed after slicing the plurality of wafers as claimed 1, wherein the damage ratio is $D=\pm(\{2*(R-r)*\sin\theta\})/S0$, wherein D is the damage ratio, R is a damage diameter, r is a radius of the copper line, $\theta$ is a deviation angle of the copper line, and S0 is a maximum width of the V-shaped groove.

5. The method for determining if the wire guide roller having a plurality of V-shaped grooves, each having the copper line thereon, arranged column-by-column on the periphery direction thereof is failed after slicing the plurality of wafers as claimed 1, wherein step (b) comprises further a step of:
   (b1) using the optical inspection device to acquire the picture of a lateral row portion of the plurality of V-shaped grooves first and then acquire a rest portion of the plurality of V-shaped grooves row by row in the depth direction thereof.

6. The method for determining if the wire guide roller having a plurality of V-shaped grooves, each having the copper line thereon, arranged column-by-column on the periphery direction thereof is failed after slicing the plurality of wafers as claimed 1, comprising further a step of:

(h) using the optical inspection device to automatically issue a notification signal regarding the wire guide roller has become failed.

\* \* \* \* \*